United States Patent
Uno

(10) Patent No.: US 10,958,359 B2
(45) Date of Patent: Mar. 23, 2021

(54) COMMUNICATION APPARATUS AND COMMUNICATION SYSTEM

(71) Applicant: Sony Semiconductor Solutions Corporation, Kanagawa (JP)

(72) Inventor: Masahiro Uno, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/322,384

(22) PCT Filed: Jul. 6, 2017

(86) PCT No.: PCT/JP2017/024829
§ 371 (c)(1),
(2) Date: Jan. 31, 2019

(87) PCT Pub. No.: WO2018/051616
PCT Pub. Date: Mar. 22, 2018

(65) Prior Publication Data
US 2019/0173591 A1    Jun. 6, 2019

(30) Foreign Application Priority Data

Sep. 13, 2016   (JP) .............................. JP2016-178403

(51) Int. Cl.
*H04B 13/00* (2006.01)
*H04B 1/3827* (2015.01)
*H01Q 1/27* (2006.01)

(52) U.S. Cl.
CPC ........... *H04B 13/005* (2013.01); *H01Q 1/273* (2013.01); *H04B 1/385* (2013.01); *H04B 1/3838* (2013.01); *H04B 2001/3855* (2013.01); *H04B 2001/3861* (2013.01)

(58) Field of Classification Search
CPC .................................................... H04B 13/005
See application file for complete search history.

(56) References Cited

U.S. PATENT DOCUMENTS

| 7,386,121 B1* | 6/2008 | Rivas ..................... H01Q 1/245 343/702 |
| 2004/0036854 A1* | 2/2004 | Fukuda ................ A61B 5/6838 356/39 |
| 2011/0213205 A1* | 9/2011 | Uchiyama .......... A61B 1/00009 600/118 |

FOREIGN PATENT DOCUMENTS

| JP | 2008-050892 A | 3/2008 |
| JP | 2009-224875 A | 10/2009 |
| JP | 2012-244457 A | 12/2012 |
| JP | 2014-072550 A | 4/2014 |
| JP | 2015-037202 A | 2/2015 |

(Continued)

*Primary Examiner* — Hsinchun Liao
(74) *Attorney, Agent, or Firm* — Michael Best & Friedrich LLP

(57) ABSTRACT

A communication apparatus of the present disclosure includes: an antenna unit including a human body electrode and a spatial electrode; a communication circuit unit that performs communication using at least a human body as a communication medium via the antenna unit; and a shielding structure that has an opening into which a portion of the human body or a communication conductor electrically conducted to the human body is insertable, and contains at least a portion of the antenna unit of the communication circuit unit and the antenna unit.

23 Claims, 25 Drawing Sheets

(56) References Cited

FOREIGN PATENT DOCUMENTS

WO      2007/066406 A1    6/2007
WO      2016/024603 A1    2/2016

* cited by examiner

[FIG. 1]
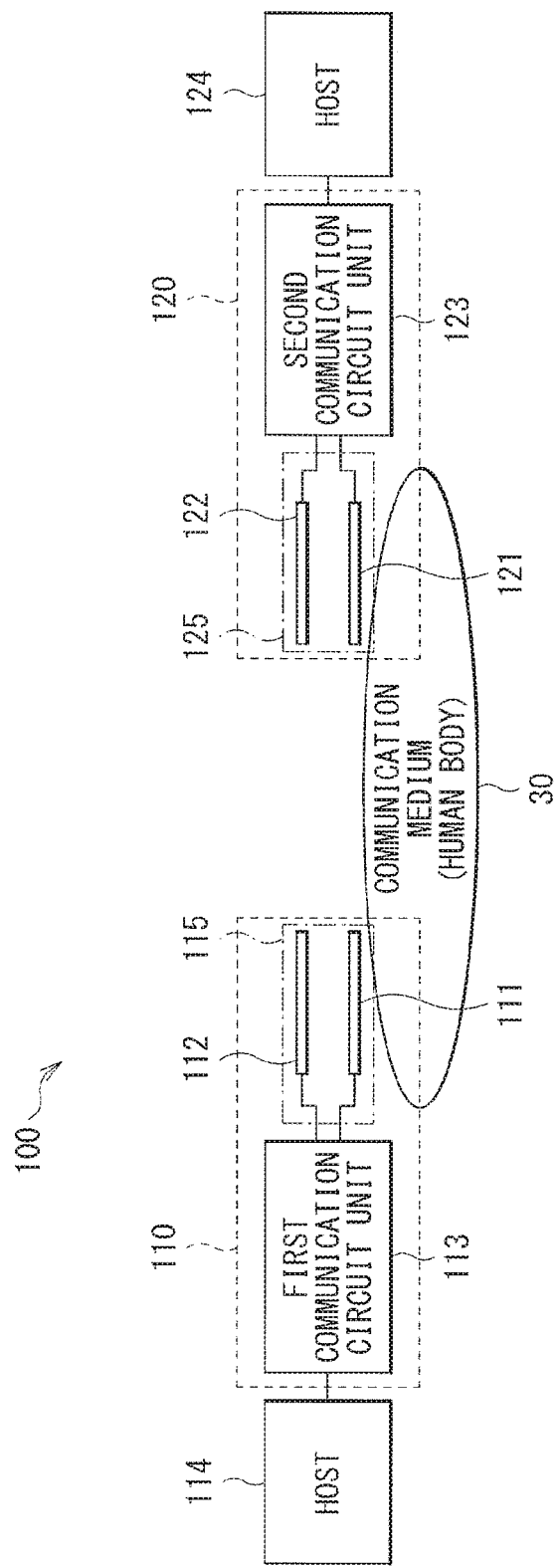

[FIG. 2]
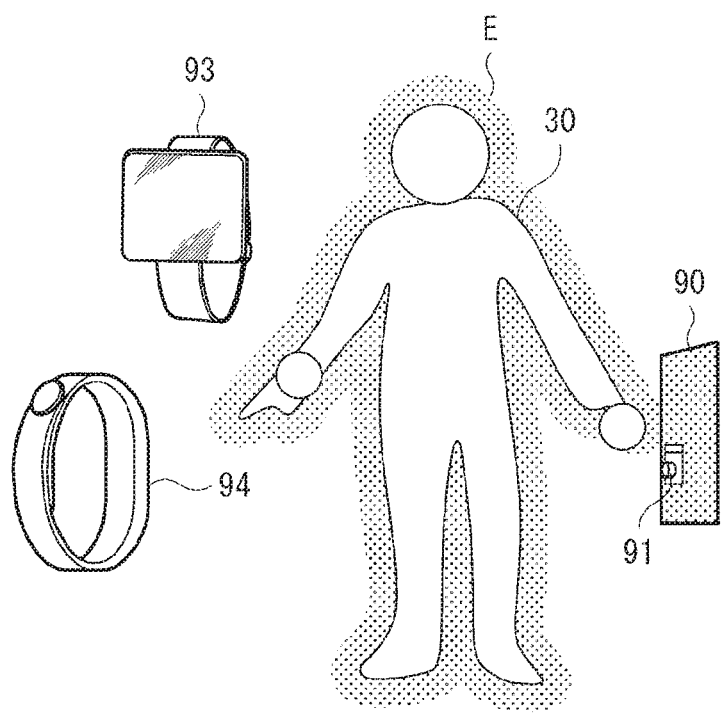

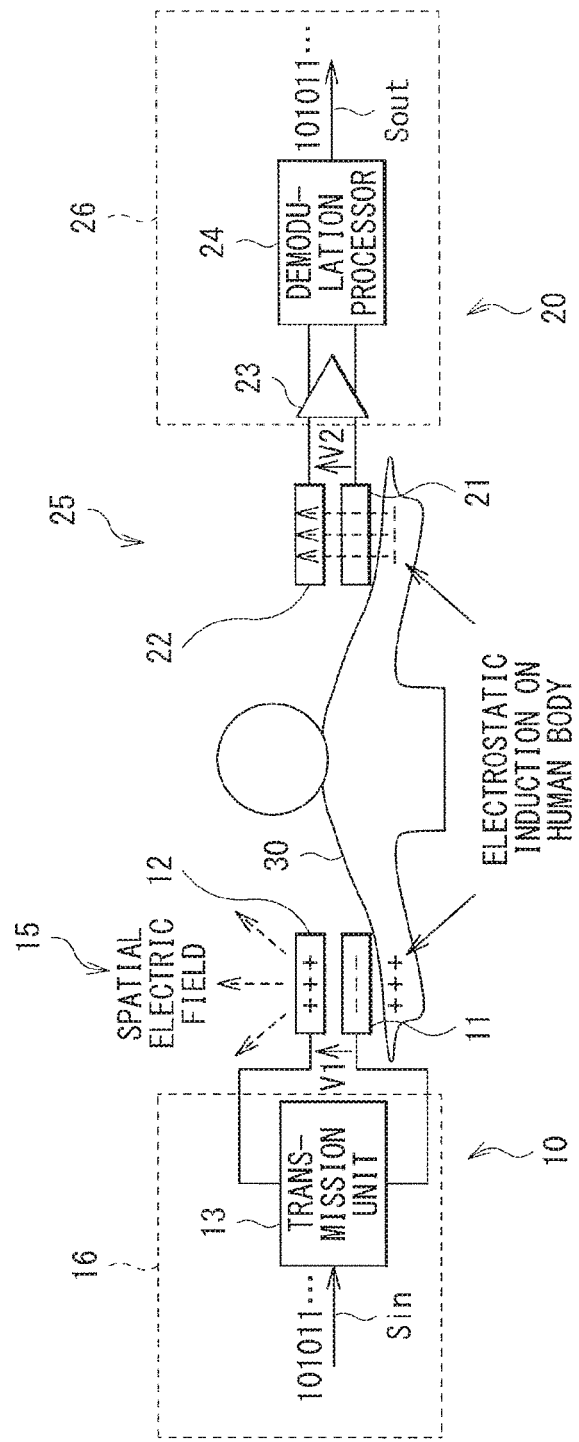
[FIG. 3]

[FIG. 4]
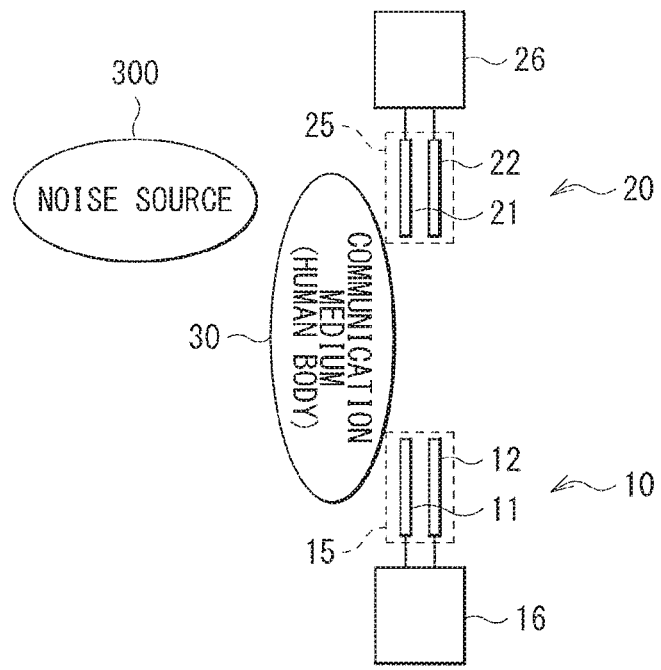
[FIG. 5]
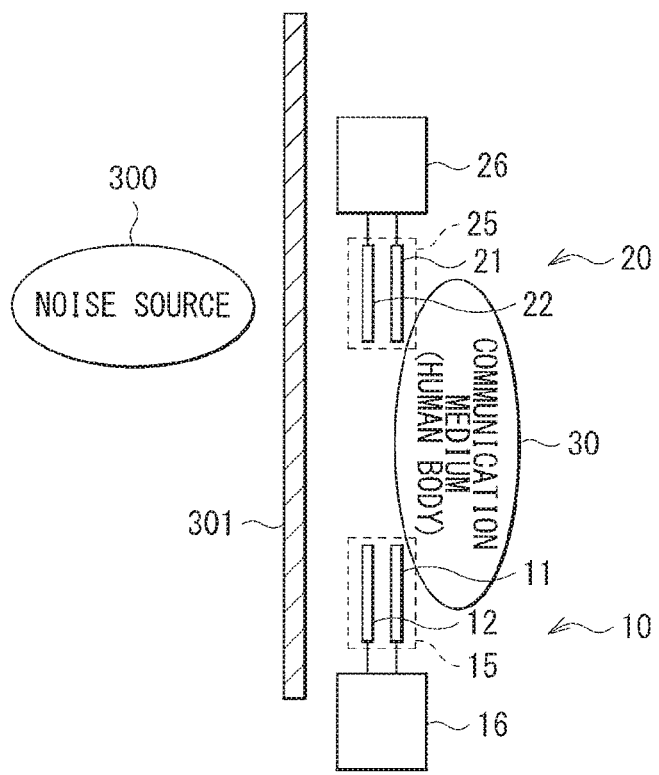

[ FIG. 6 ]
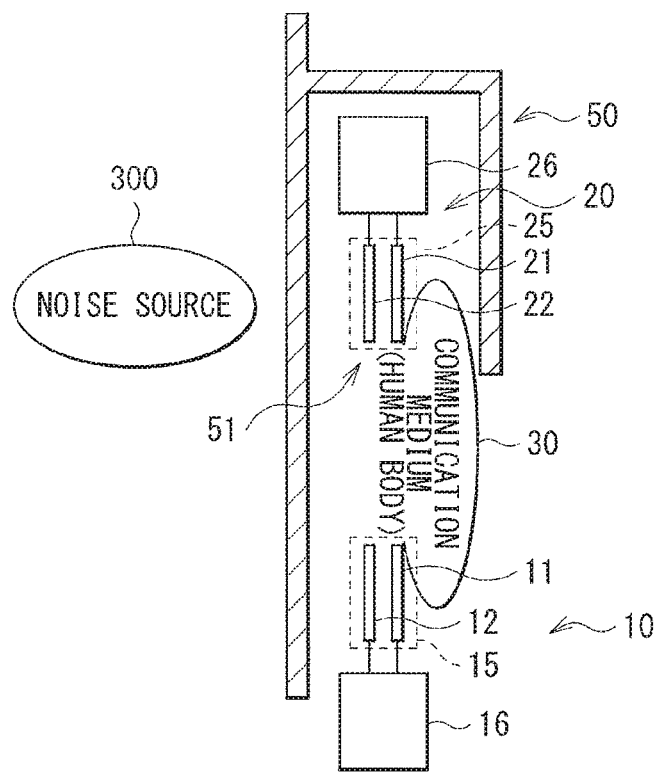

[FIG. 7]
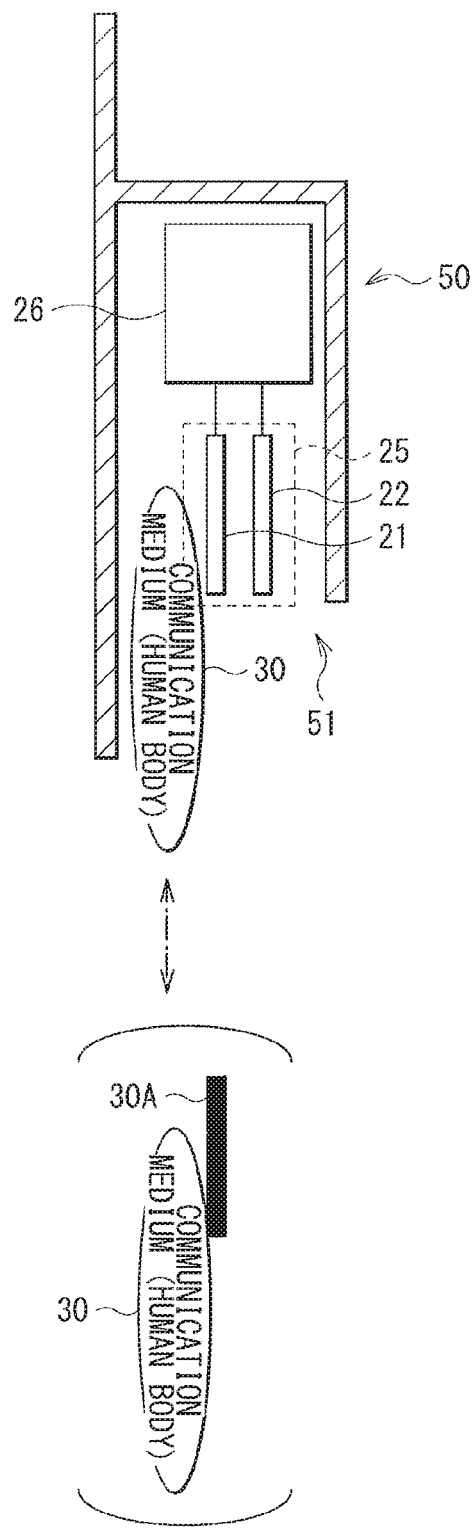

[ FIG. 8 ]
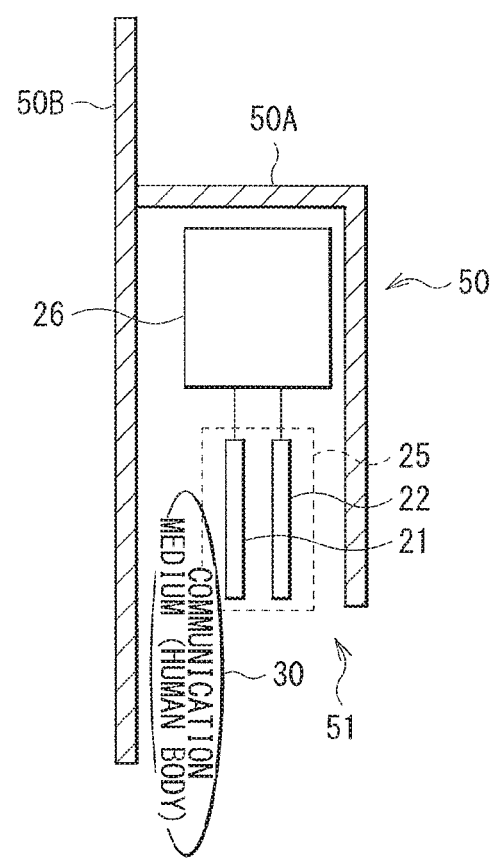

[ FIG. 9 ]
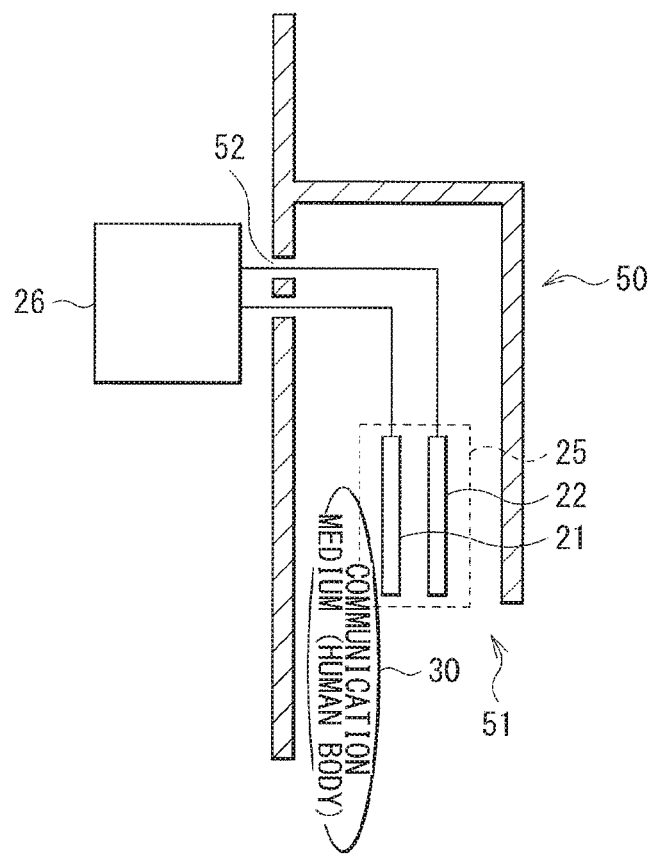

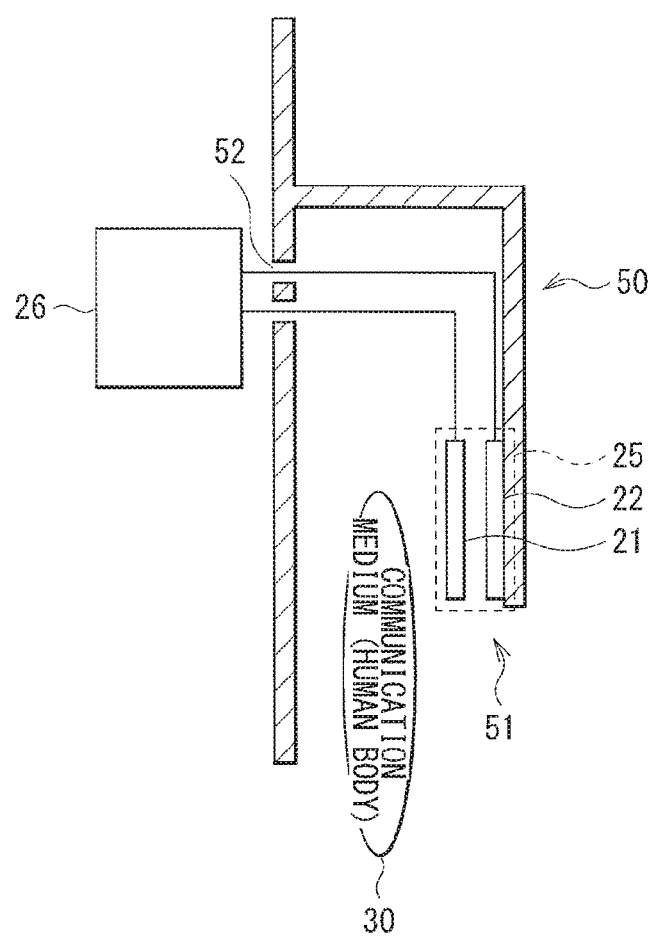
[ FIG. 10 ]

[ FIG. 11 ]
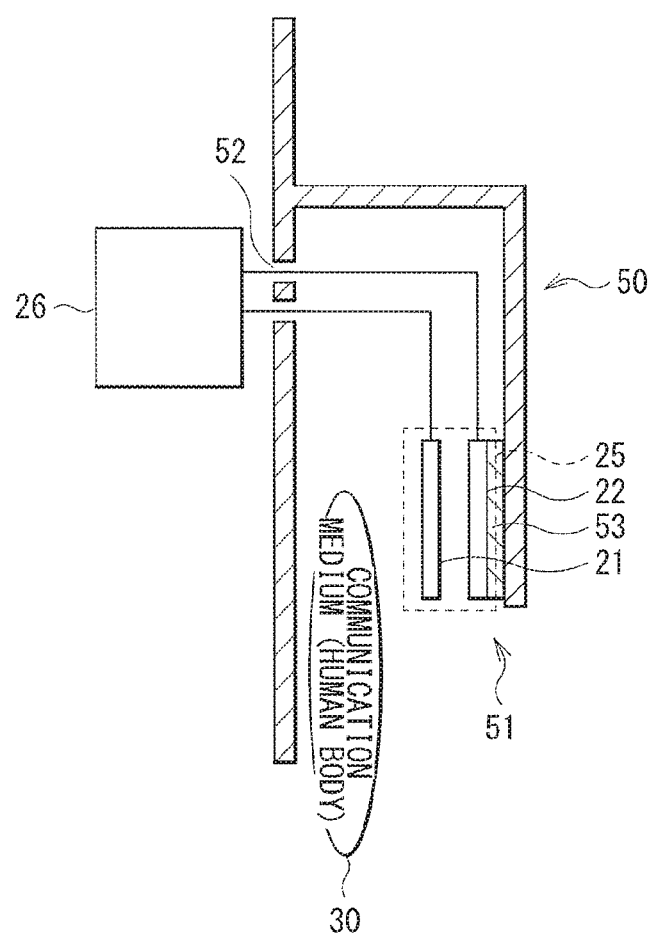

[ FIG. 12 ]
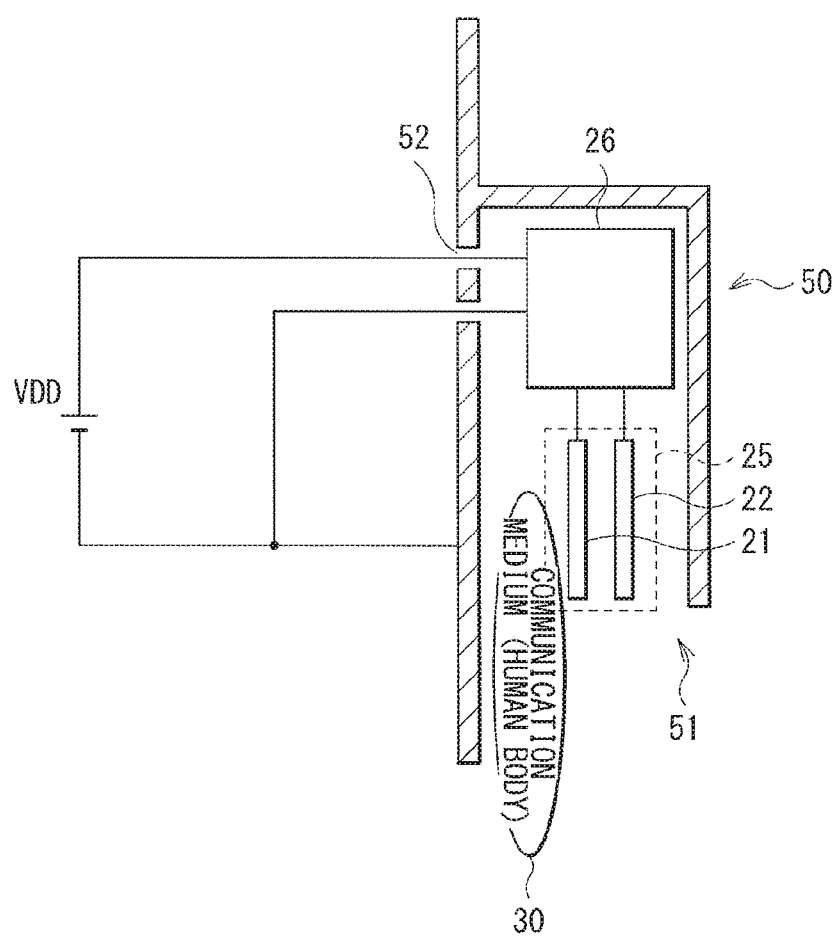

[ FIG. 13 ]
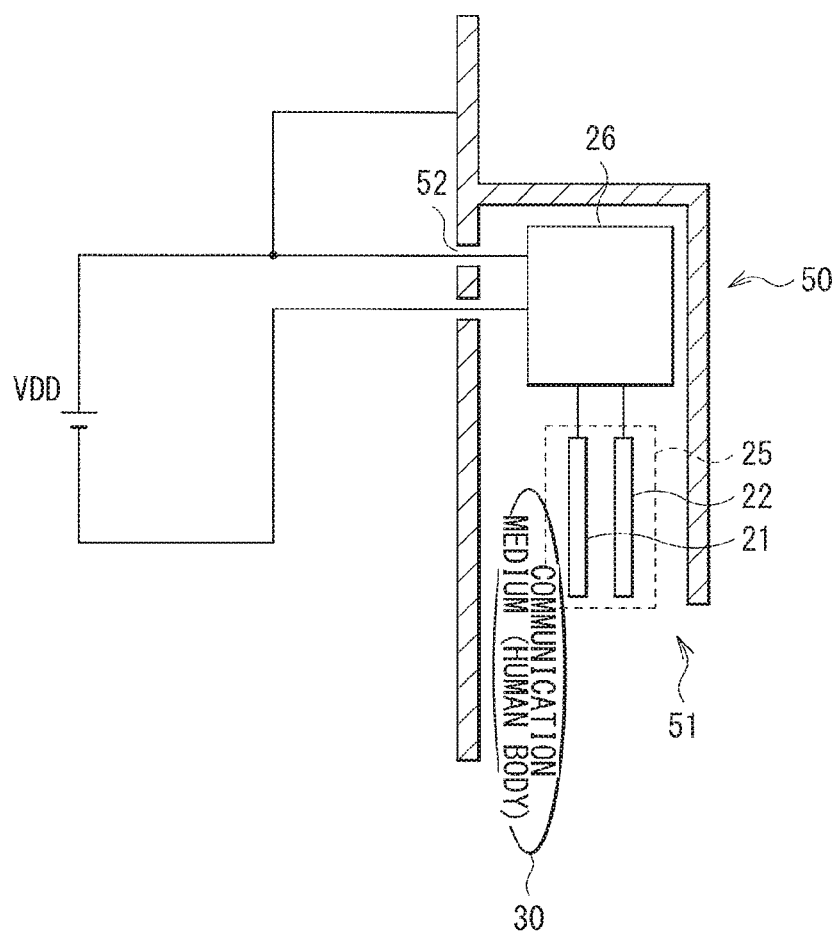

[ FIG. 14 ]
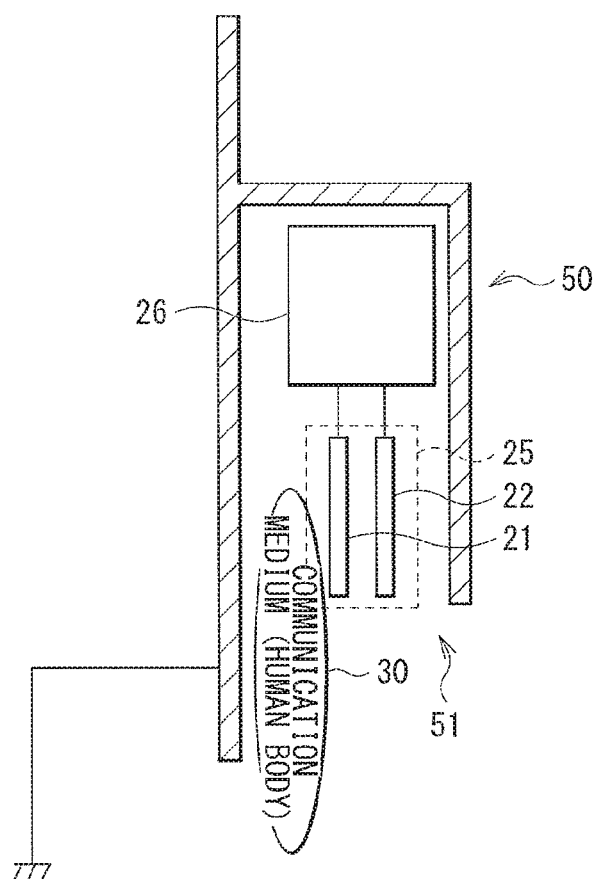

[ FIG. 15 ]
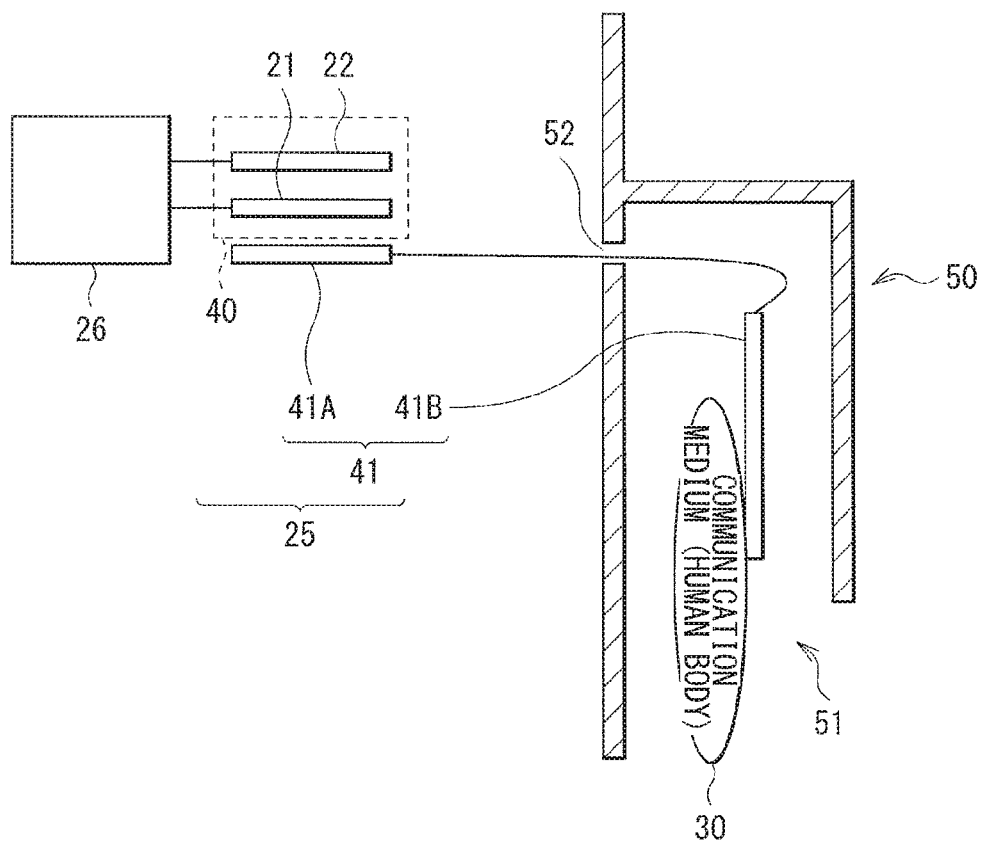

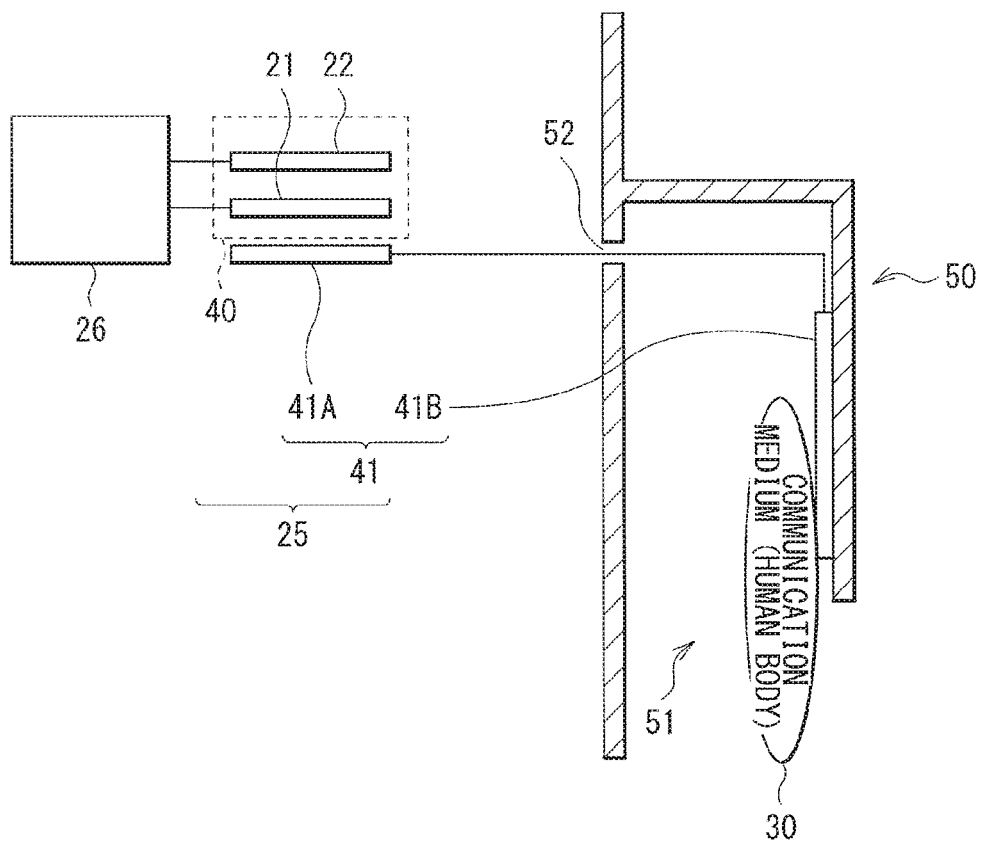
[ FIG. 16 ]

[ FIG. 17 ]
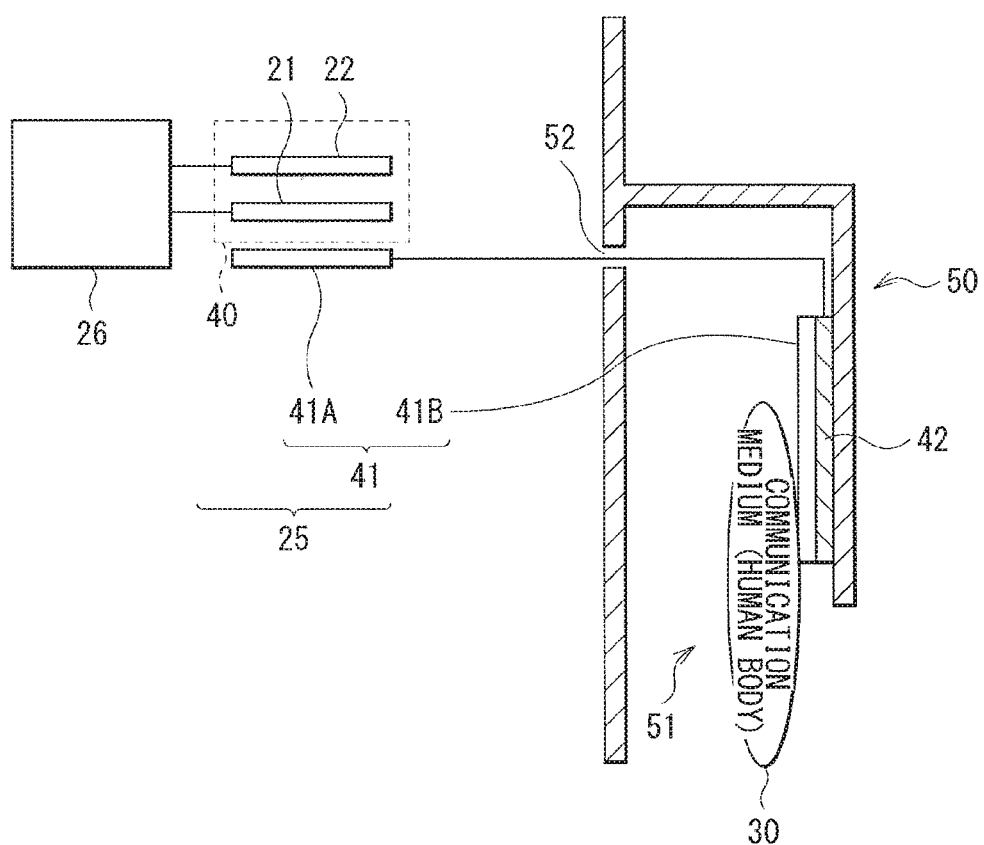

[ FIG. 18 ]
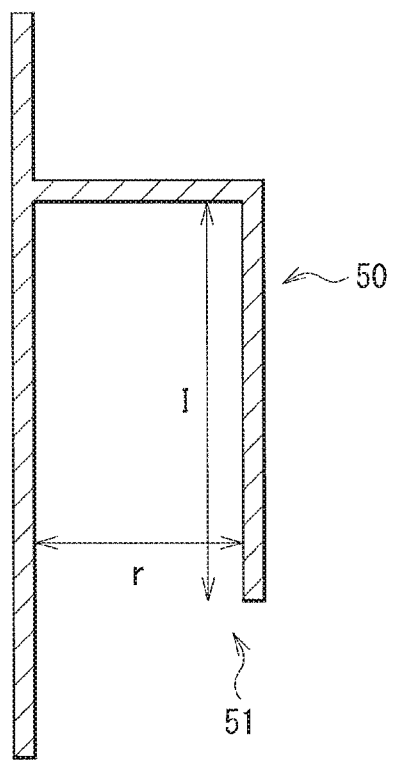

[FIG. 19]
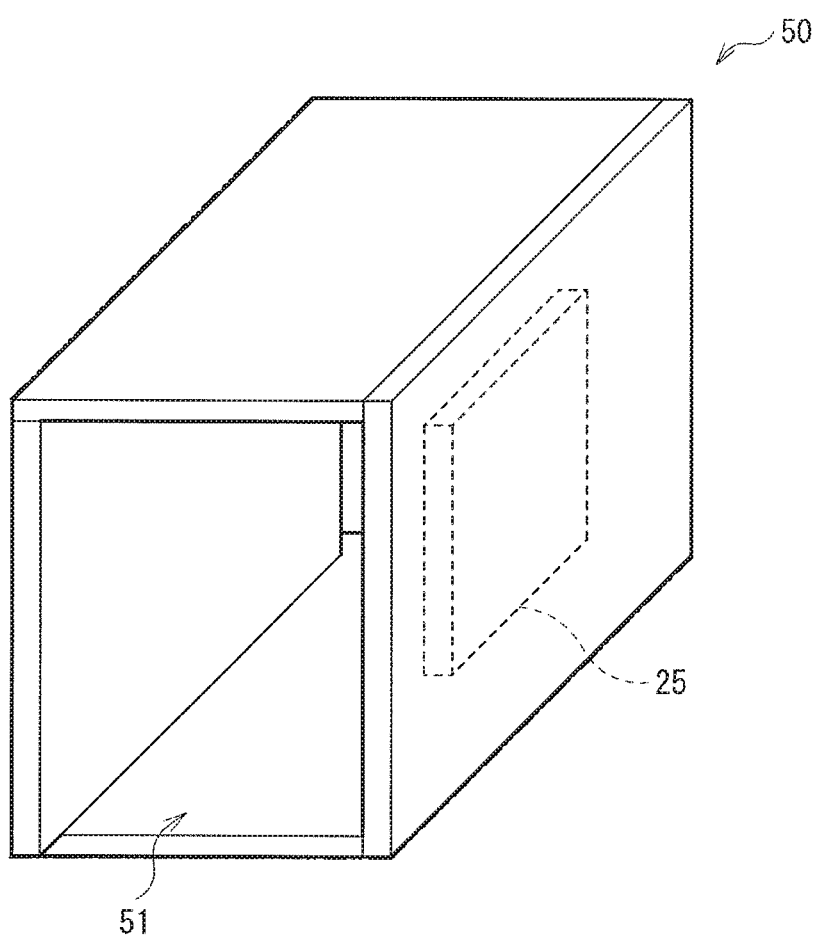

[ FIG. 20 ]
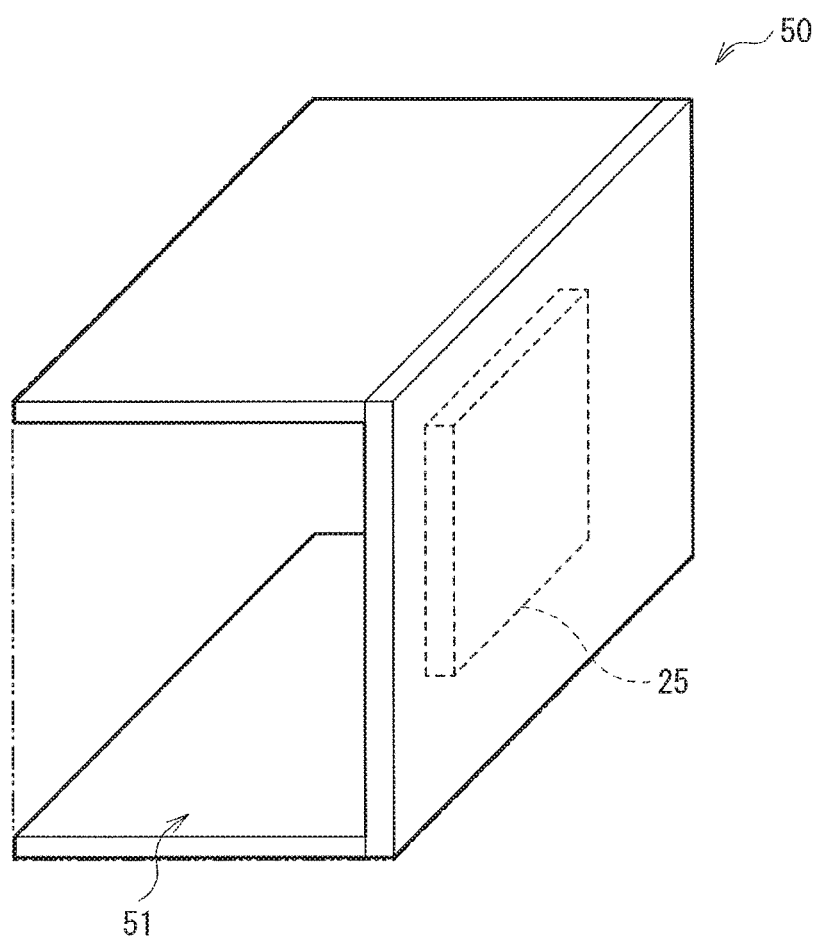

[ FIG. 21 ]
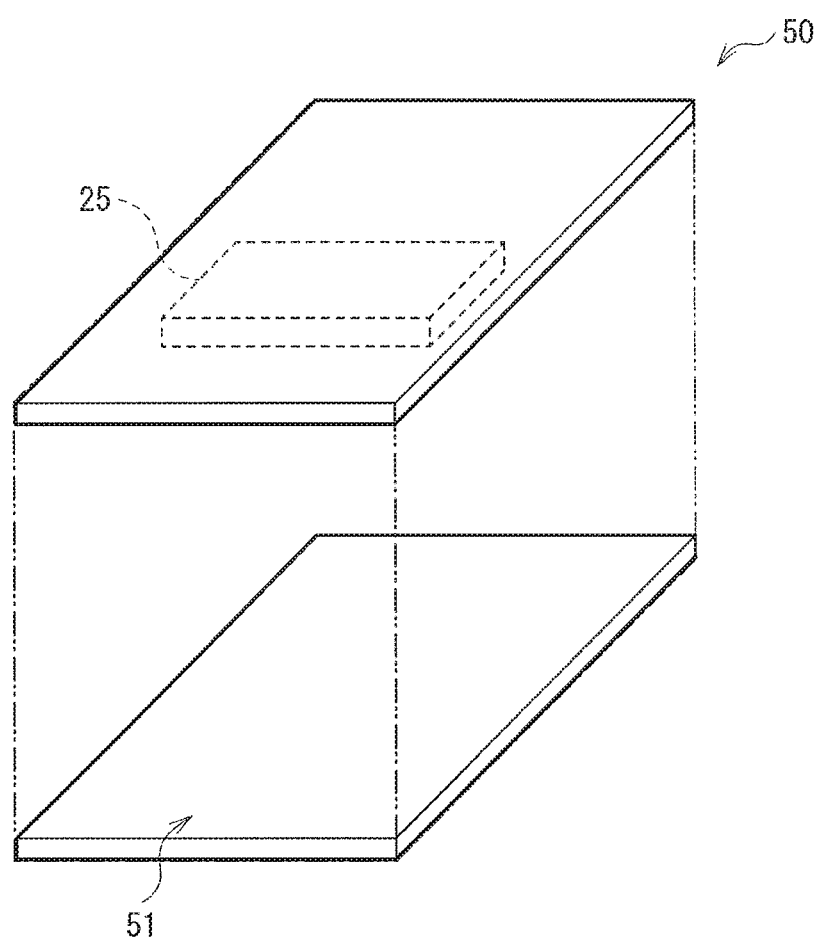

[ FIG. 22 ]
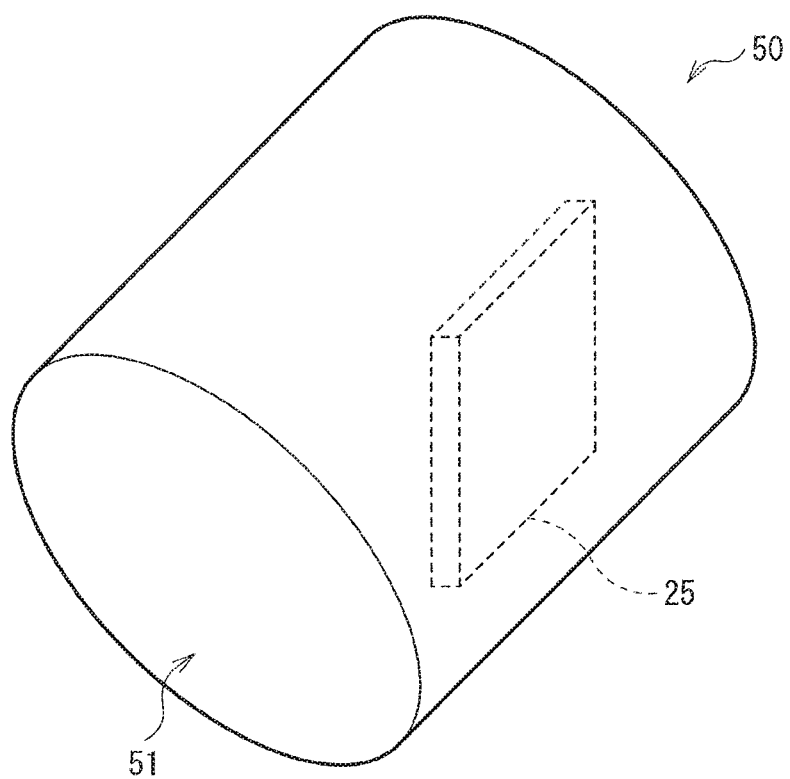

[ FIG. 23 ]
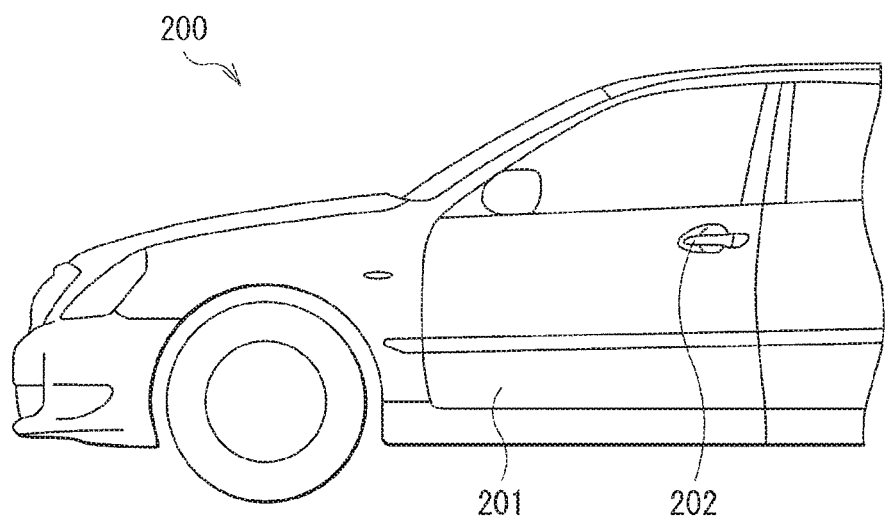
[ FIG. 24 ]
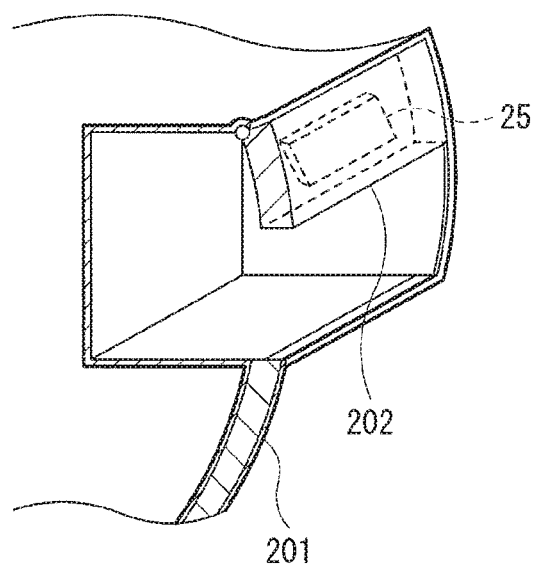

[ FIG. 25 ]
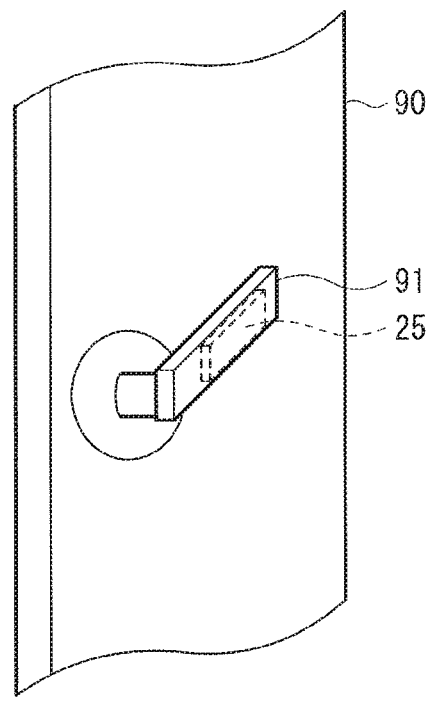

[FIG. 26]
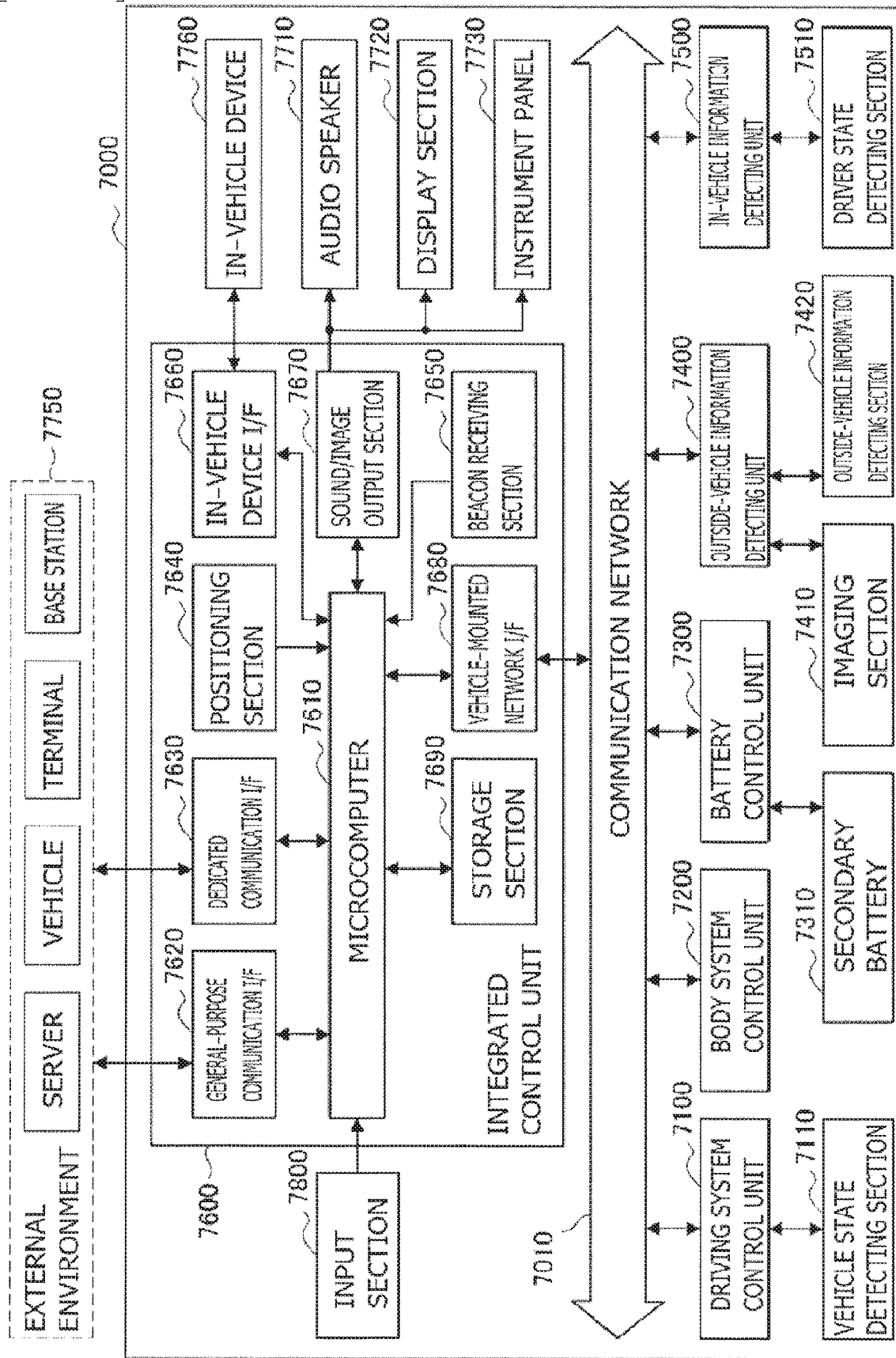

[FIG. 27]
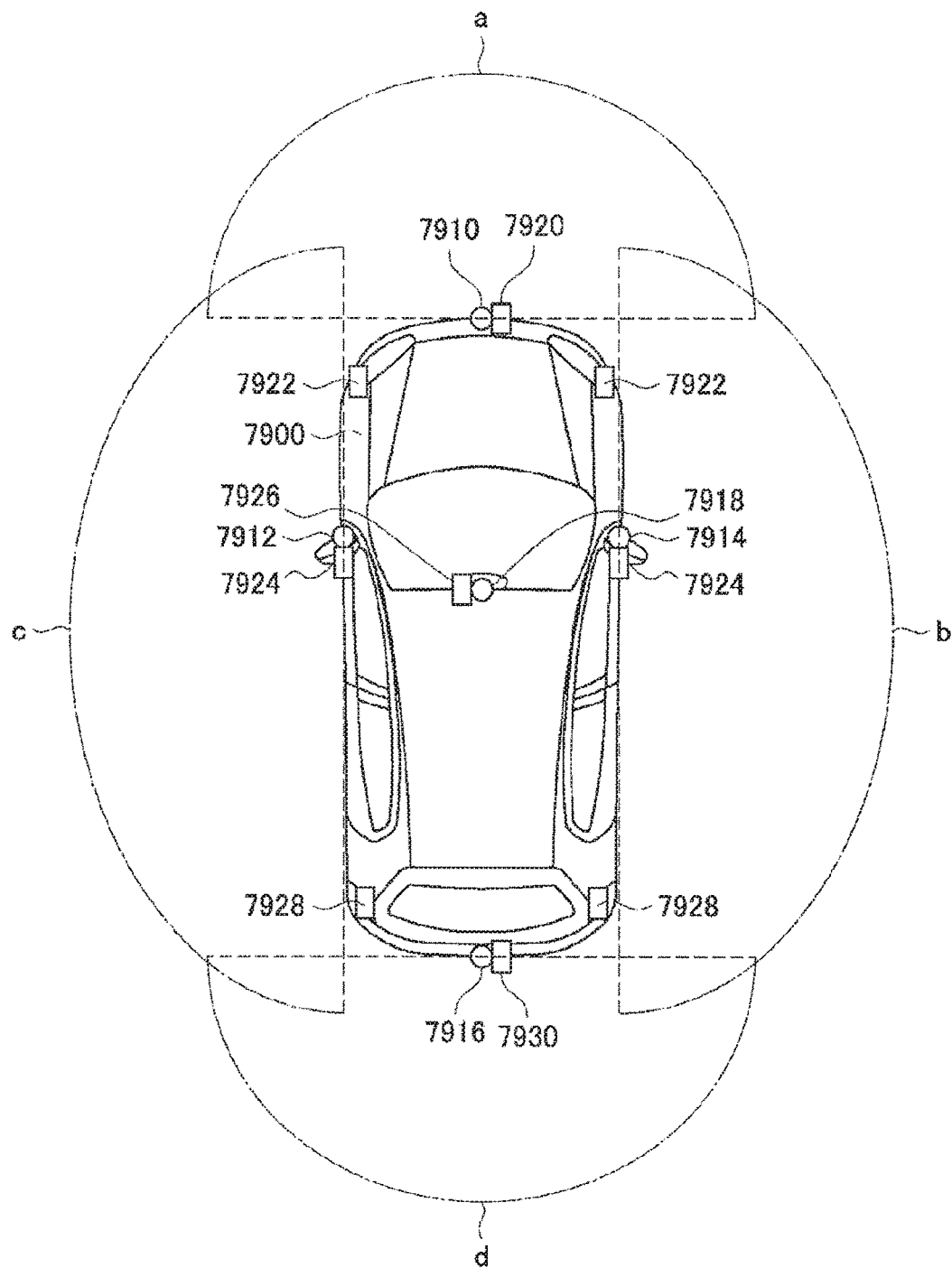

COMMUNICATION APPARATUS AND COMMUNICATION SYSTEM

TECHNICAL FIELD

The present disclosure relates to a communication apparatus and a communication system that are suitable for communication using a human body as a communication medium.

BACKGROUND ART

There is known a communication system using electric field communication technology that uses a human body as a communication medium.

CITATION LIST

Patent Literature

PTL 1: Japanese Unexamined Patent Application Publication No. 2009-224875
PTL 2: Japanese Unexamined Patent Application Publication No. 2014-72550
PTL 3: Japanese Unexamined Patent Application Publication No. 2015-37202

SUMMARY OF THE INVENTION

In a communication system using electric field communication technology, presence of a noise source, etc. may cause degradation in communication performance.

It is desirable to provide a communication apparatus and a communication system that make it possible to suppress an influence of the noise source, etc. and improve communication performance.

A communication apparatus includes: an antenna unit including a human body electrode and a spatial electrode; a communication circuit unit that performs communication using at least a human body as a communication medium via the antenna unit; and a shielding structure that has an opening into which a portion of the human body or a communication conductor electrically conducted to the human body is insertable, and contains at least a portion of the antenna unit of the communication circuit unit and the antenna unit.

A communication system according to an embodiment of the present disclosure includes: a first communication apparatus; and a second communication apparatus that performs communication using a human body as a communication medium with the first communication apparatus, the second communication apparatus including: an antenna unit including a human body electrode and a spatial electrode, a communication circuit unit that performs communication using at least the human body as a communication medium via the antenna unit, and a shielding structure that has an opening into which a portion of the human body or a communication conductor electrically conducted to the human body is insertable, and contains at least a portion of the antenna unit of the communication circuit unit and the antenna unit.

In the communication apparatus or the communication system according to the embodiment of the present disclosure, the shielding structure having the opening into which a portion of the human body or the communication conductor electrically conducted to the human body contains at least a portion of the antenna unit of the communication circuit unit and the antenna unit.

According to the communication apparatus or the communication system according to the embodiment of the present disclosure, the shielding structure having the opening into which a portion of the human body or the communication conductor electrically conducted to the human body contains at least a portion of the antenna unit, which makes it possible to suppress an influence of a noise source, etc. by the shielding structure. This makes it possible to improve communication performance.

It is to be noted that effects described here are not necessarily limited and may include any of effects described in the present disclosure.

BRIEF DESCRIPTION OF THE DRAWINGS

FIG. 1 is a configuration diagram illustrating an overview of a communication system according to a comparative example using a human body as a communication medium.

FIG. 2 is a configuration diagram illustrating the overview of the communication system according to the comparative example.

FIG. 3 is a configuration diagram illustrating the overview of the communication system according to the comparative example.

FIG. 4 is an explanatory diagram illustrating issues of the communication system according to the comparative example.

FIG. 5 is an explanatory diagram illustrating the issues of the communication system according to the comparative example.

FIG. 6 is a configuration diagram schematically illustrating a configuration example of a communication system according to a first embodiment of the present disclosure.

FIG. 7 is a configuration diagram schematically illustrating a configuration example of a communication apparatus according to the first embodiment.

FIG. 8 is a configuration diagram schematically illustrating an example of a variation of a shielding structure.

FIG. 9 is a configuration diagram schematically illustrating an example of a variation of the shielding structure.

FIG. 10 is a configuration diagram schematically illustrating an example of a variation of the shielding structure.

FIG. 11 is a configuration diagram schematically illustrating an example of a variation of the shielding structure.

FIG. 12 is a configuration diagram schematically illustrating an example of a variation of the shielding structure.

FIG. 13 is a configuration diagram schematically illustrating an example of a variation of the shielding structure.

FIG. 14 is a configuration diagram schematically illustrating an example of a variation of the shielding structure.

FIG. 15 is a configuration diagram schematically illustrating an example of a variation of the shielding structure.

FIG. 16 is a configuration diagram schematically illustrating an example of a variation of the shielding structure.

FIG. 17 is a configuration diagram schematically illustrating an example of a variation of the shielding structure.

FIG. 18 is an explanatory diagram illustrating a relationship between an opening and a depth of the shielding structure.

FIG. 19 is a configuration diagram schematically illustrating an example of a variation of the shielding structure.

FIG. 20 is a configuration diagram schematically illustrating an example of a variation of the shielding structure.

FIG. 21 is a configuration diagram schematically illustrating an example of a variation of the shielding structure.

FIG. 22 is a configuration diagram schematically illustrating an example of a variation of the shielding structure.

FIG. 23 is a configuration diagram schematically illustrating an application example of the shielding structure to a doorknob of a vehicle.

FIG. 24 is a configuration diagram schematically illustrating the application example of the shielding structure to the doorknob of the vehicle.

FIG. 25 is a configuration diagram schematically illustrating an application example of the shielding structure to a typical doorknob.

FIG. 26 is a block diagram depicting an example of schematic configuration of a vehicle control system.

FIG. 27 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

0. Comparative Example (Overview and Issues of Communication System Using Human Body as Communication Medium) (FIGS. 1 to 5)
1. First Embodiment
   1.1 Basic Configurations of Communication Apparatus Having Shielding Structure and Communication System (FIGS. 6 and 7)
   1.2. Variations of Shielding Structure (FIGS. 8 to 25)
   1.3 Effects
2. Second Embodiment (Practical Application Example) (FIGS. 26 and 27)
3. Other Embodiments

0. Comparative Example (Overview of Communication System Using Human Body as Communication Medium)

FIGS. 1 and 2 illustrate an overview of a communication system according to a comparative example using a human body 30 as a communication medium with use of electric field communication technology.

A communication system 100 according to this comparative example includes a first communication apparatus 110 and a second communication apparatus 120.

For example, the communication system 100 is usable for communication between a communication apparatus mounted in a wearable device such as a smartwatch 93 and a wristband terminal 94 and a communication apparatus mounted in a doorknob 91 of a door 90, a smartphone 92, etc., as illustrated in FIG. 2. One of the first communication apparatus 110 and the second communication apparatus 120 may be provided in the wearable device, and the other may be provided in the door 90, etc. Moreover, the communication system 100 is usable for unlocking of a door of an automobile, etc. For example, one of the first communication apparatus 110 and the second communication apparatus 120 may be provided in a door of an automobile.

The first communication apparatus 110 includes a first antenna unit 115 and a first communication circuit unit 113. The first antenna unit 115 includes a first human body electrode 111 and a first spatial electrode 112. The first communication circuit unit 113 is coupled to a host 114.

The second communication apparatus 120 includes a second antenna unit 125 and a second communication circuit unit 123. The second antenna unit 125 includes a second human body electrode 121 and a second spatial electrode 122. The second communication circuit unit 123 is coupled to a host 124.

Each of the first communication circuit unit 113 and the second communication circuit unit 123 includes an electric field communication mode (quasi-electrostatic field communication mode) communication circuit.

The first communication circuit unit 113 may include at least a transmission circuit (a transmitter). The second communication circuit unit 123 may include at least a reception circuit (a receiver). Each of the first communication circuit unit 113 and the second communication circuit unit 123 may include a transmission-reception circuit, which allows for bidirectional communication between the first communication apparatus 110 and the second communication apparatus 120.

In a case where a signal is transmitted front the first communication apparatus 110, the first communication circuit unit 113 generates, between the first human body electrode 111 and the first spatial electrode 112, a potential-difference transmission signal including a signal modulated by a predetermined modulation mode. The first human body electrode 111 is disposed closer to the human body 30 than the first spatial electrode 112. Hence, the first human body electrode 111 is disposed to have stronger electrostatic coupling with a communication medium (the human body 30) than the first spatial electrode 112.

In the communication system, a human body-side communication path using the human body 30 as a communication medium is formed between the first human body electrode 111 and the second human body electrode 121 by approach of a portion of the human body 30 closer to the second human body electrode 121 than to the second spatial electrode 122. Moreover, a space-side communication path using space (for example, air) as a communication medium is formed between the first spatial electrode 112 and the second spatial electrode 122.

A potential difference corresponding to a transmission signal to be transmitted via the communication medium (the human body 30) is generated between the second human body electrode 121 and the second spatial electrode 122. The second communication circuit unit 123 detects the potential difference generated between the second human body electrode 121 and the second spatial electrode 122, performs a demodulation process corresponding to the modulation mode of the first communication circuit unit 113 to generate a reception signal, and outputs the reception signal as an output signal.

In the electric field communication mode (the quasi-electrostatic field communication mode), an electric field E is distributed onto a surface of the human body by contact of a human with the human body electrode or approach of the human to the human body electrode to perform communication, as illustrated in FIG. 2. Hence, communication is enabled only in close proximity to the human body 30. The electric field communication mode has high compatibility with a wearable device.

FIG. 3 illustrates a configuration example in which the first communication apparatus 110 and the second communication apparatus 120 in the communication system 100 illustrated in FIG. 1 respectively serve as a transmitter 10 and a receiver 20.

The transmitter 10 includes a communication circuit unit 16 and a transmission antenna unit 15 corresponding to the first antenna unit 115 in FIG. 1.

The transmission antenna unit 15 includes a human body-side transmission electrode 11 corresponding to the first human body electrode 111 in FIG. 1 and a space-side transmission electrode 12 corresponding to the first spatial electrode 112 in FIG. 1. The communication circuit unit 16 includes a transmission unit 13.

The receiver 20 includes a communication circuit unit 26 and a reception antenna unit 25 corresponding to the second antenna unit 125 in FIG. 1.

The reception antenna unit 25 includes a human body-side reception electrode 21 corresponding to the second human body electrode 121 in FIG. 1 and a space-side reception electrode 22 corresponding to the second spatial electrode 122 in FIG. 1. The communication circuit unit 26 includes a reception amplifier 23 and a demodulation processor 24.

The human body-side transmission electrode 11 is disposed closer to the human body 30 than the space-side transmission electrode 12. Hence, the human body-side transmission electrode 11 is disposed to have stronger electrostatic coupling with the communication medium (the human body 30) than the space-side transmission electrode 12.

An input signal Sin serving as a source of a transmission signal is inputted to the transmission unit 13. The transmission unit 13 generates, between the human body-side transmission electrode 11 and the space-side transmission electrode 12, a transmission signal of a potential difference V1 including a signal modulated by a predetermined modulation mode. The transmission unit 13 generates, between the human body-side transmission electrode 11 and the space-side transmission electrode 12, a fluctuating voltage of data by Manchester coding, for example. The space-side transmission electrode 12 generates a spatial electric field corresponding to the fluctuating voltage. An electric field is generated around the human body by the human body-side transmission electrode 11 and the space-side transmission electrode 12. Fluctuations in the thus-generated electric field cause deviation of electric charges on the human body by electrostatic induction.

Approach of a portion of the human body 30 closer to the human body-side reception electrode 21 than to the space-side reception electrode 22 causes fluctuations in voltage between the human body-side reception electrode 21 and the space-side reception electrode 22.

A potential difference V2 corresponding to a transmission signal to be transmitted via the human body 30 is generated between the human body-side reception electrode 21 and the space-side reception electrode 22. The reception amplifier 23 detects the potential difference generated between the human body-side reception electrode 21 the space-side reception electrode 22, and amplifies the potential difference V2 as a reception signal. In the demodulation processor 24, the reception signal is subjected to a demodulation process corresponding to the modulation mode of the transmission unit 13, and the thus-processed reception signal is outputted as an output signal Sout. In the demodulation processor 24, for example, a demodulation process by Manchester coding is performed.

(Issue)

In the communication system with use of the electric field communication technology as described above, communication performance may be degraded due to deterioration in a communication environment caused by external noise. The communication system in FIG. 3 is described below as an example.

For example, in a case where a noise source 300 is provided as illustrated in FIG. 4, noise may be intruded into the communication circuit unit 26 of the receiver 20. In this case, as illustrated in FIG. 5, even if a metal plate 301 is provided between the noise source 300 and the communication system, noise may be reradiated from the metal plate 301 to be intruded into the communication circuit unit 26.

For example, in a case where the receiver 20 is applied to the door 90 used for going in and out of a room, for example, an air-conditioner, a vending machine, a lighting apparatus, etc. may be the noise source 300. Moreover, for example, in a case where the receiver 20 is applied to a door of a vehicle such as an automobile, an engine, a motor, an electrical system, etc. may be the noise source 300.

There is a high possibility that large noise is induced in a body of an automobile and a metal door of a room having an indoor generation source, for example. In a case where the receiver 20 is mounted in the body or a metal object, placing the reception antenna unit 25 in an induced noise electric field may cause interference with communication, thereby degrading communication quality.

In a case where a noise source is provided around an electrode of the reception antenna unit 25, a noise voltage may be induced in the electrode by an electric field generated by the noise source. The noise voltage may cause an error in symbol determination of the reception signal, thereby degrading communication performance.

For example, in a case where the receiver 20 is applied to a door of a room, outside a room provided with an induction machine, etc., noise generated by the induction machine may be superimposed on the reception signal. In a case where a metal door is installed on the room, an electric field generated by noise may cause the door to be electrically charged, thereby resulting in noise reradiation.

Typical methods of suppressing noise include electrostatic shielding. This method is containing a circuit, etc., which is desired to be protected from noise, inside an electrically-conductive enclosed space structure such as a shielding case. Moreover, grounding the enclosed space structure makes it possible to enhance a shielding effect.

However, in quasi-electrostatic field communication, in general, communication starts by approach or contact of a communication medium such as the human body 30. Accordingly, in a case where the reception antenna unit 25 and the communication circuit unit 26 of the receiver 20 are contained inside enclosed space, neither approach nor contact of the communication medium is enabled, and communication is therefore not enabled. Moreover, another issue is that in the quasi-electrostatic field communication, in some cases, communication may start only by approach of the communication medium. Accordingly, there is an issue that communication that is not intended by a user is established.

1. First Embodiment

[1.1 Basic Configurations of Communication Apparatus Having Shielding Structure and Communication System]

In the present embodiment, in view of the above-described issues, there is provided technology that makes it possible to suppress an influence of a noise source, etc. and achieve an improvement in communication performance through containing at least a portion of an antenna unit in a shielding structure 50.

Configurations of a communication apparatus and a communication system according to the present embodiment may be substantially similar to configurations of the communication apparatus and the communication system according to the comparative example illustrated in FIGS. 1 to 3 described above, except for portions related to the shielding structure 50 to be described below. In the following, a case where the shielding structure 50 is applied to the receiver 20 in the communication system illustrated in FIG. 3 is described as an example; however, the shielding structure 50 may be applied to one or both of the first communication apparatus 110 and the second communication apparatus 120 in the communication system 100 in FIG. 1, for example. In this case, the first communication apparatus 110 and the second communication apparatus 120 may serve as transceivers that bidirectionally transmit and receive data.

FIGS. 6 and 7 each schematically illustrate a configuration example of the communication apparatus and the communication system according to the first embodiment of the present disclosure.

As described above, in the communication system according to the present embodiment, the receiver 20 may include the shielding structure 50.

The shielding structure 50 has an opening 51 into which a portion of the human body 30 or a communication conductor 30A electrically conducted to the human body 30 is insertable. The shielding structure 50 contains at least a portion of the reception antenna unit 25 of the communication circuit unit 26 and the reception antenna unit 25.

An object to be inserted and put into the shielding structure 50 from the opening 51 may be a portion of the human body 30, for example, any part such as a hand, a foot, and a head. Moreover, the object to be inserted from the opening 51 may be a communication conductor 30A such as a metal stick that is not the human body 30, as illustrated in FIG. 7. For example, communication may be performed through holding the metal stick as the communication conductor 30A by a hand, and putting the metal stick into an interior of the shielding structure 50 from the opening 51 to bring the metal stick close to or in contact with the human body-side reception electrode 21.

The shielding structure 50 may contain at least the human body-side reception electrode 21 and the space-side reception electrode 22 to allow the space-side reception electrode 22 to be disposed at a position closer to the shielding structure 50 than the human body-side reception electrode 21.

The shielding structure 50 desirably includes an electrically-conductive material. The electrically-conductive material may be a metal, electrically-conductive plastic, or a transparent electrode. Moreover, in this case, an insulator layer may be provided on at least one surface of an outer surface and an inner surface of the shielding structure 50. Accordingly, communication may be performed only in a case where a portion of the human body 30 or the communication conductor 30A electrically conducted to the human body 30 is inserted from the opening 51.

A large potential difference may be generated outside the shielding structure 50. In a case where the reception antenna unit 25 is placed outside the shielding structure 50, noise may be received. In contrast, a potential difference is small inside the shielding structure 50; therefore, a noise level may be reduced.

[1.2 Variations of Shielding Structure]
(Configuration Example in which Shielding Structure 50 Contains Human Body Electrode and Spatial Electrode)

The shielding structure 50 may include a first structure portion 50A and a second structure portion 50B that is in contact with or integral with the first structure portion 50A, as illustrated in FIG. 8.

The shielding structure 50 may be in contact with or integral with an external member. For example, the second structure portion 50B in FIG. 8 may be the external member. In this case, the external member may be a door. The external member may be a door 201 of a vehicle 200 as illustrated in FIGS. 23 and 24, for example. The external member may be a door 90 used for going in and out of a room, as illustrated in FIG. 25, for example.

At least a portion of the shielding structure 50 may configure a doorknob of the door. For example, at least a portion of the shielding structure 50 may configure a doorknob 202 of the door 201 of the vehicle 200 as illustrated in FIGS. 23 and 24. Moreover, for example, at least a portion of the shielding structure 50 may configure a doorknob 91 of the door 90 used for going and out of the room, as illustrated in FIG. 25.

The doorknob 202 of the door 201 of the vehicle 200 may have, for example, a configuration in which a hand is inserted from underside, as illustrated in FIG. 24, and may have, for example, a configuration in which a hand is insertable from above and from underside, as illustrated in FIG. 23.

The doorknob 91 of the door 90 used for going in and out of the room may have, for example, a lever-like shape, as illustrated in FIG. 25.

In a case where a doorknob is configured with use of the shielding structure 50, for example, at least a portion of the reception antenna unit 25 may be disposed in space between a body of the door and an inside of the doorknob. Moreover, the opening 51 may be formed in space between the body of the door and the inside of the doorknob.

The communication system is applicable to locking and unlocking of the door as described above. In a case where the door includes a metal, noise generated by a noise source provided inside a vehicle, or inside or outside a room is induced in the door including the metal, but change in a potential generated inside the shielding structure 50 is not large, and interference with quasi-electrostatic field communication is therefore small. Moreover, in a case where a human brings his hand close to the outside of a doorknob portion without inserting his hand, the communication medium is provided outside the shielding structure 50, and a communication signal on the communication medium is therefore not induced in a communication electrode contained inside the shielding structure 50. Accordingly, the quasi-electrostatic field communication is not performed. Hence, unlocking of the door is not performed without intention of a user.

The communication circuit unit 26 may be disposed outside the shielding structure 50, as illustrated in FIG. 9. The shielding structure 50 may have a hole 52, as illustrated in FIG. 9. The reception antenna unit 25 and the communication circuit unit 26 may be electrically conducted to each other via the hole 52 of the shielding structure 50, as illustrated in FIG. 9.

Moreover, the space-side reception electrode 22 may be fixed to the inner surface of the shielding structure 50, as illustrated in FIG. 10.

Further, the space-side reception electrode 22 may be fixed to the inner surface of the shielding structure 50 with an insulator layer 53 interposed therebetween.

The shielding structure 50 may be coupled to a power source VDD of the communication circuit unit 26, as illustrated in FIGS. 12 and 13. For example, the shielding structure 50 may be coupled to a ground-side electrode of the power source VDD of the communication circuit unit 26, as illustrated in FIG. 12. Alternatively, the shielding structure 50 may be coupled to a positive electrode of the power source VDD of the communication circuit unit 26, as illustrated in FIG. 13.

Furthermore, the shielding structure 50 may be grounded, as illustrated in FIG. 14.

As described above, in a configuration in which at least the human body-side reception electrode 21 and the space-side reception electrode 22 are contained in the shielding structure 50, it is desirable to contain at least the entirety of the space-side reception electrode 22 inside the shielding structure 50.

(Configuration Example in which Shielding Structure 50 Contains Auxiliary Electrode)

The reception antenna unit 25 may include a main electrode unit 40 and an auxiliary conductor unit 41, as illustrated in FIG. 15.

The reception antenna unit 25 may further include a first auxiliary electrode 41A disposed close to or in contact with the human body-side reception electrode 21, and a second auxiliary electrode 41B electrically conducted to the first auxiliary electrode 41A, as illustrated in FIG. 15.

The main electrode unit 40 may include the human body-side reception electrode 21 and the space-side reception electrode 22. The auxiliary conductor unit 41 may include the first auxiliary electrode 41A and the second auxiliary electrode 41B.

The shielding structure 50 may contain at least the second auxiliary electrode 41B, as illustrated in FIG. 15. The main electrode unit 40, the first auxiliary electrode 41A, and the communication circuit unit 26 may be disposed outside the shielding structure 50, as illustrated in FIG. 15.

The shielding structure 50 may have a hole 52, as illustrated in FIG. 15. The first auxiliary electrode 41A and the second auxiliary electrode 41B may be electrically conducted to each other via the hole 52 of the shielding structure 50, as illustrated in FIG. 15.

Moreover, the second auxiliary electrode 41B may be fixed to the inner surface of the shielding structure 50, as illustrated in FIG. 16.

Further, the second auxiliary electrode 41B may be fixed to the inner surface of the shielding structure 50 with an insulator layer 42 interposed therebetween, as illustrated in FIG. 17.

As described above, in a configuration in which the shielding structure 50 contains the auxiliary electrode, for example, in a case where a hand of a human equipped with the transmitter 10 is inserted into the opening 51 of the shielding structure 50, a communication signal is induced in the main electrode unit 40 via the second auxiliary electrode 41B, a lead, and the first auxiliary electrode 41A, which makes it possible to start communication. In this case, it is possible to downsize the second auxiliary electrode 41B more than the main electrode unit 40. Moreover, in the main electrode unit 40 that has a double-plate configuration and is directly coupled to the communication circuit unit 26, a capacitance thereof exerts a large influence on communication performance. However, the second auxiliary electrode 41B is a single electrode, and is not directly coupled to the communication circuit unit 26, which makes it possible to design the second auxiliary electrode 41B independently in comparison with the main electrode unit 40.

It is to be noted that an example in which only the second auxiliary electrode 41B is contained in the shielding structure 50 has been described above; however, the main electrode unit 40 and the first auxiliary electrode 41A may be further contained. Moreover, the communication circuit unit 26 may be further contained. This makes it possible to further enhance resistance against external noise.

(Size of Shielding Structure 50)

As illustrated in FIG. 18, in a case where r represents a minimum width of the opening 51, and l represents a shortest length in depth of the shielding structure 50, a ratio r/l between the minimum width r and the shortest length l is desirably 1 or less.

For example, assuming that a human inserts his finger from the opening 51 and brings the finger close to or in contact with the human body-side reception electrode 21 to perform communication, in consideration of a thickness of the finger, the minimum width r of the opening 51 is desirably about 2 cm or more. It is necessary to bring a fingertip close to or in contact with the human body-side reception electrode 21; therefore, similarly, the shortest length l in depth is desirably about 2 cm or more. Accordingly, r/l is desirably 1 or less.

(About Shape of Shielding Structure 50)

A shape of a portion or the entirety of the shielding structure 50 may be a three-dimensional shape or a two-dimensional shape. A portion or the entirety of the shielding structure 50 may configure a portion of a solid of revolution or a portion of a rectangular parallelepiped.

For example, the shape of the entirety of the shielding structure 50 may be a shape in which one or two surfaces of six surfaces configuring a rectangular parallelepiped are opened, as illustrated in FIG. 19.

Alternatively, for example, the shape of the entirety of the shielding structure 50 may be a shape in which three surfaces of the six surfaces configuring the rectangular parallelepiped are opened, as illustrated in FIG. 20.

Alternatively, for example, two surfaces opposed to each other of the six surfaces configuring the rectangular parallelepiped may configure the shielding structure 50, as illustrated in FIG. 21. In this case, the two surfaces opposed to each other may be electrically conducted to each other via a lead, etc.

Alternatively, for example, the shape of a portion or the entirety of the shielding structure 50 may be a shape having a curved surface, as illustrated in FIG. 22.

A shape of the opening 51 may be a substantially quadrangular shape as illustrated in FIG. 19, or a substantially circular shape or a substantially elliptical shape as illustrated in FIG. 22.

[1.3 Effects]

As described above, according to the present embodiment, the shielding structure 50 having the opening 51 into which a portion of the human body 30 or the communication conductor 30A electrically conducted to the human body 30 is insertable contains at least a portion of the antenna unit of the communication apparatus, which makes it possible to suppress an influence of the noise source, etc. by the shielding structure 50. This makes it possible to improve communication performance.

In a case where the noise source is provided outside the shielding structure 50, change in a potential generated by the noise source provided inside the shielding structure 50 is suppressed, which makes it possible to suppress noise induced in the electrode of the antenna unit and reduce interference of noise with quasi-electrostatic field communication, thereby improving communication performance.

According to the present embodiment, for example, even if the communication medium such as the human body 30 is brought close to or in contact with the shielding structure 50, transfer of the communication signal induced in the communication medium to the electrode is suppressed unless the communication medium is inserted into the opening 51, which makes it possible to avoid start of unintended communication.

Moreover, in a configuration in which the shielding structure 50 contains the auxiliary electrode, it is possible to provide flexibility to arrangement of the communication circuit and the electrodes of the antenna unit. Further, it is possible to simplify the configuration of the auxiliary electrode more than those of a typical human body electrode and a typical spatial electrode, thereby thinning and downsizing the auxiliary electrode. This makes it possible to downsize the shielding structure 50.

It is to be noted that the effects described in the description are merely illustrative and non-limiting, and other effects may be included. This also applies to effects achieved by the following other embodiments.

2. Second Embodiment (Practical Application Example)

The technology according to the present disclosure is applicable to various products. For example, the technology according to the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, an unmanned aerial vehicle, a vessel, a robot, a construction machine, an agricultural machine (a tractor), etc.

It is to be noted that in the following description, each of GSM and HDMI is a registered trademark.

FIG. 26 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 26, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 26 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 27 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview minors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 27 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 26, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 26, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 26 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication apparatus and the communication system of the present disclosure are applicable to communication with the external environment 7750 of a terminal, etc. present in proximity to the vehicle via the general-purpose communication I/F 7620, for example. Moreover, the communication apparatus and the communication system of the present disclosure are applicable to communication with the in-vehicle devices 7760 such as a mobile device and a wearable device possessed by the occupant via the in-vehicle device I/F 7660.

3. Other Embodiments

Although the technology achieved by the present disclosure is not limited to description of the foregoing respective embodiments, and may be modified in a variety of ways.

For example, the present technology may have the following configurations.

(1)

A communication apparatus including:

an antenna unit including a human body electrode and a spatial electrode;

a communication circuit unit that performs communication using at least a human body as a communication medium via the antenna unit; and a shielding structure that has an opening into which a portion of the human body or a communication conductor electrically conducted to the human body is insertable, and contains at least a portion of the antenna unit of the communication circuit unit and the antenna unit.

(2)

The communication apparatus according to (1), in which in a case where r represents a minimum width of the opening and l represents a shortest length in depth of the shielding structure, a ratio r/l between the minimum width r and the shortest length l is 1 or less.

(3)

The communication apparatus according to (1) or (2), in which the shielding structure includes a first structure portion and a second structure portion that is in contact with or integral with the first structure portion.

(4)

The communication apparatus according to any one of (1) to (3), in which the shielding structure is in contact with or integral with an external member.

(5)

The communication apparatus according to (4), in which the external member is a door, and at least a portion of the shielding structure configures a doorknob of the door.

(6)

The communication apparatus according to any one of (1) to (5), in which the shielding structure contains at least the human body electrode and the spatial electrode to allow the spatial electrode to be disposed at a position closer to the shielding structure than the human body electrode.

(7)

The communication apparatus according to (6), in which the spatial electrode is fixed to an inner surface of the shielding structure.

(8)

The communication apparatus according to (7), in which the spatial electrode is fixed to the inner surface of the shielding structure with an insulator layer interposed therebetween.

(9)

The communication apparatus according to any one of (1) to (5), in which the antenna unit further includes a first auxiliary electrode and a second auxiliary electrode, the first auxiliary electrode disposed in proximity to or in contact with the human body electrode, the second auxiliary electrode electrically conducted to the first auxiliary electrode, and the shielding structure contains at least the second auxiliary electrode.

(10)

The communication apparatus according to (9), in which the second auxiliary electrode is fixed to an inner surface of the shielding structure.

(11)

The communication apparatus according to (10), in which the second auxiliary electrode is fixed to the inner surface of the shielding structure with an insulator layer interposed therebetween.

(12)

The communication apparatus according to any one of (9) to (11), in which the shielding structure has a hole, and the first auxiliary electrode and the second auxiliary electrode are electrically conducted to each other via the hole.

(13)

The communication apparatus according to any one of (1) to (12), in which the shielding structure is coupled to a power source of the communication circuit unit.

(14)

The communication apparatus according to any one of (1) to (12), in which the shielding structure is grounded.

(15)

The communication apparatus according to any one of (1) to (14), in which the shielding structure includes an electrically-conductive material.

(16)

A communication system including:

a first communication apparatus; and a second communication apparatus that performs communication using a human body as a communication medium with the first communication apparatus, the second communication apparatus including:

an antenna unit including a human body electrode and a spatial electrode, a communication circuit unit that performs communication using at least the human body as a communication medium via the antenna unit, and a shielding structure that has an opening into which a portion of the human body or a communication conductor electrically conducted to the human body is insertable, and contains at least a portion of the antenna unit of the communication circuit unit and the antenna unit.

This application claims the benefit of Japanese Priority Patent Application No. 2016-178403 filed with the Japan Patent Office on Sep. 13, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A communication apparatus comprising:

a communication circuit unit configured to detect a voltage fluctuation between a body-side electrode and a space-side electrode, the space-side electrode and the body-side electrode are electrically connected to the communication circuit unit; and a shielding structure configured to enclose a space, an opening in the shielding structure is configured to permit an object to enter the space in a manner that causes the voltage fluctuation, wherein the shielding structure includes an electrically-conductive plastic.

2. The communication apparatus according to claim 1, wherein $r/l \leq 1$, where:

"r" is a minimum width of the opening,

"l" is a shortest length in depth of the shielding structure.

3. The communication apparatus according to claim 1, wherein the communication circuit unit comprises a reception amplifier and a demodulation processor.

4. The communication apparatus according to claim 1, wherein the communication circuit unit is enclosed in the shielding structure.

5. The communication apparatus according to claim 1, wherein the space-side electrode is enclosed in the shielding structure.

6. The communication apparatus according to claim 1, wherein the body-side electrode is enclosed in the shielding structure.

7. The communication apparatus according to claim 1, wherein the body-side electrode is between the shielding structure and the object after the object enters the space enters through the opening.

8. The communication apparatus according to claim 1, wherein the body-side electrode is between the space-side electrode and the object after the object enters the space enters through the opening.

9. The communication apparatus according to claim 1, wherein the opening is configured to permit the object to come into contact with the body-side electrode after the object enters the space enters through the opening.

10. The communication apparatus according to claim 1, wherein the shielding structure comprises a first structure portion and a second structure portion, the second structure portion is in contact with or integral with the first structure portion.

11. The communication apparatus according to claim 1, wherein the shielding structure is coupled to a power source of the communication circuit unit.

12. The communication apparatus according to claim 1, wherein the shielding structure is grounded.

13. The communication apparatus according to claim 1, wherein the shielding structure desirably includes an electrically-conductive material, the electrically-conductive material may be a metal, electrically-conductive plastic, or a transparent electrode.

14. The communication apparatus according to claim 1, wherein the shielding structure includes an electrically-conductive material.

15. The communication apparatus according to claim 1, wherein the shielding structure includes a metal.

16. A communication apparatus comprising:

a communication circuit unit configured to detect a voltage fluctuation between a body-side electrode and a space-side electrode, the space-side electrode and the body-side electrode are electrically connected to the communication circuit unit; and a shielding structure configured to enclose a space, an opening in the shielding structure is configured to permit an object to enter the space in a manner that causes the voltage fluctuation, wherein the shielding structure includes a transparent electrode.

17. A communication apparatus comprising:

a communication circuit unit configured to detect a voltage fluctuation between a body-side electrode and a space-side electrode, the space-side electrode and the body-side electrode are electrically connected to the communication circuit unit;

a shielding structure configured to enclose a space, an opening in the shielding structure is configured to permit an object to enter the space in a manner that causes the voltage fluctuation; and a first auxiliary electrode electrically conducted to a second auxiliary electrode, the second auxiliary electrode is enclosed in the shielding structure.

18. The communication apparatus according to claim 17, wherein the first auxiliary electrode is close to or in contact with the body-side electrode.

19. The communication apparatus according to claim 17, wherein the opening permits the object to come into contact with the second auxiliary electrode after the object enters the shielding structure through the opening.

20. The communication apparatus according to claim 17, wherein the opening permits the object to come into contact with the second auxiliary electrode in a manner that causes the voltage fluctuation.

21. The communication apparatus according to claim 17, wherein the communication circuit unit is outside the shielding structure.

22. The communication apparatus according to claim 17, wherein the space-side electrode is outside the shielding structure.

23. The communication apparatus according to claim 17, wherein the body-side electrode is outside the shielding structure.

* * * * *